H. M. SWEENEY.
Fertilizing Distributors.
No. 137,734.                                Patented April 8, 1873.
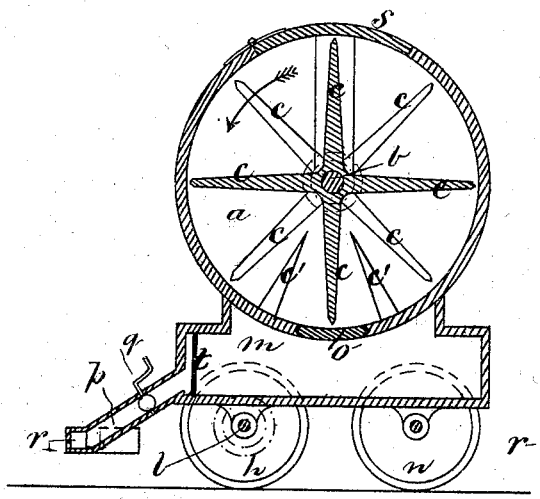
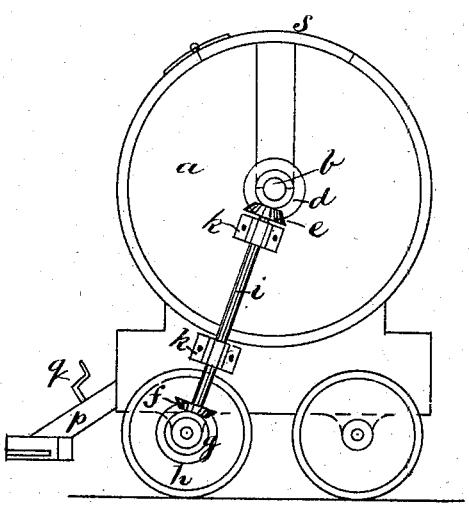
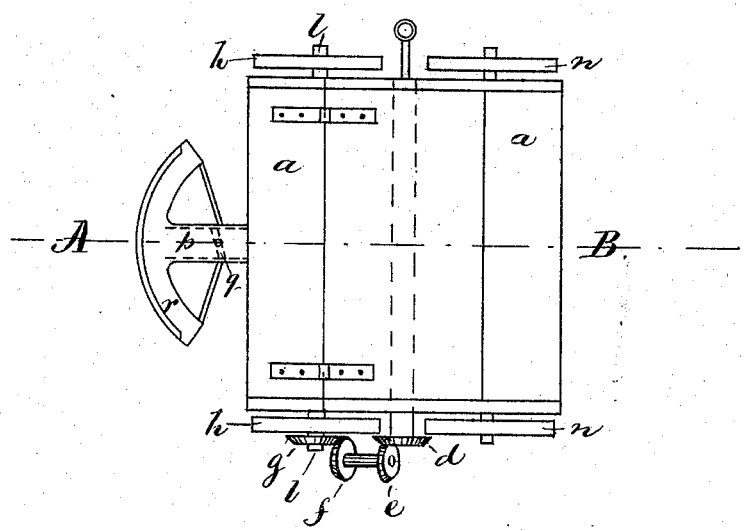
Witnesses:
John R. Beard
Wm. H. Hutchinson
Inventor:
Hugh M. Sweeney
by Alban Andrén, atty

UNITED STATES PATENT OFFICE.

HUGH M. SWEENEY, OF WORCESTER, MASSACHUSETTS, ASSIGNOR OF ONE-HALF HIS RIGHT TO OTIS N. POND, OF SAME PLACE.

IMPROVEMENT IN FERTILIZING-DISTRIBUTERS.

Specification forming part of Letters Patent No. 137,734, dated April 8, 1873; application filed January 6, 1873.

*To all whom it may concern:*

Be it known that I, HUGH M. SWEENEY, of Worcester, in the county of Worcester and State of Massachusetts, have invented certain new and useful Improvements in Fertilizing-Machines, of which the following is a specification:

My invention relates to a portable machine for sprinkling liquid manure on the ground; and consists in a receiving and mixing chamber in which the manure and a suitable quantity of water are mixed and stirred well together. Below this mixing-chamber is a tank or reservoir, into which the mixture is deposited after being thoroughly beaten and mixed. The receiving-tank stands, in connection with a suitable sprinkler or outlet-pipe through which the liquid manure is forced over the surface of the ground, as the machine is drawn forward by manual or other power, as will now be fully shown and described.

On the drawing, Figure 1 is a ground plan. Fig. 2 is an end view, and Fig. 3 is a cross-section over the line A B taken on Fig. 1.

Similar letters refer to similar parts wherever they occur on the drawing.

*a* is the mixing-chamber, which may be made of a cylindrical or any other suitable form or shape, as may be convenient. In the ends of the chamber *a* are provided bearings for the shaft *b* to revolve in, as shown. To the shaft *b* is secured or made in one piece with the same a number of arms, *c c c*, that are kept in a rotary motion by means of the gears *d e f g* or their equivalents that connect the shaft *b* to the driving-wheels *h h* with a positive motion. A suitable disconnecting arrangement may be employed on any of the gears, so as to be able to disconnect the shaft *b* from the driving-shaft *l*. The bevel-gear *d* is secured to the shaft *b*; the bevel-gears *e f* are secured to the intermediate shaft *i* movable in bearings *k k* attached to the end of the chamber *a* or otherwise, as may be convenient; and the bevel-gear *g* is secured to the driving-shaft *l*, as shown. From this it will be seen that the arms *c c c* are set in a rotary motion as soon as the machine is propelled over the ground. When the manure is of such a nature as to require a more thorough beating or cutting I employ stationary arms or knives *c′ c′*, attached to the inside of the chamber *a*, as shown in Fig. 3. The rotating arms *c c c* will thus pass between the stationary arms *c′ c′*, thereby mixing and cutting the manure still more effectually. Below the mixing-chamber *a* is placed the receiving-tank *m* mounted on suitable wheels, *h h, n n*, as shown. In the bottom of the chamber *a* is an opening covered with a sliding or other gate or valve, *o*, by means of which the contents of the chamber *a* can easily be emptied into the tank *m*, when the manure is stirred and mixed sufficiently. A pipe, *p*, provided with a suitable stop-valve, *q*, leads to the sprinkler *r*, through which the liquid manure is ejected and deposited on the ground that is to be fertilized. Before the liquid manure in the tank *m* reaches the sprinkler *r* it has to pass through a suitable strainer, *t*, as shown in Fig. 3, whereby the sprinkler *r* is prevented from being clogged up by pieces too large to pass through it. The sprinkler *r* may be made in such a manner as to throw out one broad sheet of the liquid manure, or it may be made so as to eject one or more single streams according to the conditions of the ground or vegetables that are to be fertilized. Under certain conditions it may be necessary to increase or decrease the size of the openings in the sprinkler so as to adjust the size and direction of the ejected streams of fertilizing liquid. It is not necessary that the sprinkler should be located at the rear of the machine, as shown in the drawing, as I may to equal advantage place it in the bottom of the tank *m*, in which case I would employ a shaking apparatus and a suitable press, so as to force out the less liquid manure that would not flow out by its own gravity. The chamber *a* is provided with a portable cover, S, on the top, as shown, through which the manure and water are thrown into the said chamber.

The operation of my machine is as follows: Suitable solid or liquid manure is thrown into the chamber *a*, together with water enough to make a thin liquid. The machine is then set in operation, when the arms *c c* commence to mix and beat the mixture so as to form a thin and homogeneous liquid. The gate *o* is then opened and the contents of the chamber $a$ deposited in the tank $m$ below. New manure and water is then again thrown into the chamber $a$ and the machine propelled over the ground, as usual. When it is desired to throw the liquid manure on the ground all that is required is to open the valve $q$ and the contents of the tank $m$ flows out through the sprinkler $r$, thus depositing the liquid manure evenly over the ground that is to be fertilized. By this arrangement I am able to deposit the fertilizing material very evenly on the ground or field, and by having the manure in a liquid state I am able to impregnate the earth more thoroughly than could otherwise be done in the ordinary way.

Having thus fully described the nature, construction, and operation of my invention, I wish to secure by Letters Patent and claim—

The combination of the mixing-chamber $a$, revolving arms $c\ c\ c$, shaft $b$, tank $m$, strainer $t$, sprinkler or outlet $r$, driving-shaft $l$, and the gears $d\ e\ f\ g$, shaft $i$, or their equivalents, as and for the purpose herein shown and described.

HUGH M. SWEENEY.

Witnesses:
ALBAN ANDRÉN,
JOHN R. HEARD.